UNITED STATES PATENT OFFICE.

JOHN RADCLIFFE, OF EAST BARNET, ENGLAND.

COMPOSITION CONTAINING PITCH.

1,071,792.  Specification of Letters Patent.   Patented Sept. 2, 1913.

No Drawing.  Application filed February 20, 1912. Serial No. 678,887.

*To all whom it may concern:*

Be it known that I, JOHN RADCLIFFE, a subject of the King of Great Britain and Ireland, and resident of East Barnet, in the county of Herts, England, have invented certain new and useful Compositions Containing Pitch, of which the following is a specification.

It has been proposed to prepare compositions containing pitch or resin mixed with ground wood or cellulose material.

The present invention aims to manufacture with ordinary pitch (*i. e.* pitch obtained as distillation residues and hereinafter referred to as distillation pitch) compositions approximating in physical properties to natural asphalts or bitumens, such for instance as that known as "Trinidad", that is to say which, while liquefiable by heat, possess flexibility together with a high melting or softening point and also the property of low contraction when cold and set after being mixed with mineral matter to form a paving.

The invention further aims to produce from distillation pitch valuable compositions presenting the above properties in a high degree, which may even be superior to those of natural asphalts or bitumens, and this with the aid of a material which at present is practically a waste product.

The invention further aims to produce valuable compositions applicable for road making, insulating and other purposes.

The invention further aims to produce valuable materials applicable for road making and road repairing.

According to the invention I incorporate wood, peat, cellulose, or like organic matter in the state of a fine powder with the pitch and in proportions such that the composition is still fusible by a high degree of heat. The effect of the organic matter added in this proportion is that while the pitch still remains the principal ingredient of the composition, the organic matter is distributed throughout the mass of pitch and practically forms a continuous sponge, the pores of which are filled with the pitch and consequently the melting point of the pitch is raised and the pitch approximates in its physical properties to properties of the far more costly natural asphalt or bitumen. For the purpose of the invention I may use wood, peat, cellulose, or the like in fine powder in the proportion of about 5 to 20 per cent. With wood, peat, or the like, the proportion cannot be substantially greater than the figure named. I may, however, with advantage employ the impalpable organic dust which is obtained as a residue in grain milling and known as "mill dust" and which is practically a waste product. Owing to its extreme fineness this material, while it is applicable without further grinding, can be used in larger proportions than those just named. A small proportion of an oil such as linseed oil, green oil, anthracene oil, or the like, may be added to the improved compositions if desired, for imparting greater softness to the product. Powdered wood is a very suitable material for the purpose of the invention. The addition may be made to the molten pitch, or the wood or like matter may be ground up with the hard or non-fused pitch, and the whole be then fused with or without the oil. The quantity of wood or like matter will vary within the limits mentioned, according to the character of product desired. Any convenient oil may be used, preferably of high boiling point and the quantity of oil employed will likewise vary according to the particular product desired.

For the purpose of the invention I may employ cellulosic or woody matters naturally containing oils, for example seeds such as cotton seed, linseed, tung beans, soy beans, and the like. These will be reduced to a fine state, and the residual cake, after crushing to obtain the oils, may be employed, such cake still containing oil. The cake may be broken up and sieved to reject the large portions and then added to melted pitch or it may be ground up with hard pitch. The mixture is well stirred up in a fused state, with or without "driers", (such for example as lead oxid,) and may then be oxidized by well known means producing well known effects on the seed oil and increasing and improving the flexibility and high melting point of the ultimate product.

For the purpose of the invention it is essential that the woody, cellulosic or like material shall be in a fine state of division, intimately mixed with the pitch. The more intimate the mixture and permeation of the organic matter by the pitch, the better are the results.

The organic or cellulosic material may be incorporated with the pitch in various ways.

For convenience in mixing, the organic matter should be thoroughly dried at a temperature not lower than will be reached on fusion.

*Example 1.*

Pitch _____ 90 to 80 parts by weight
Ground wood or peat _____ 10 to 20 parts by weight
Linseed or other oil_ 7 parts by weight The wood is first added, coarsely powdered, to about its own weight of the molten pitch, and after the mass has set it is ground to a fine state and fused with the remainder of the pitch and the oil. Or the wood may first be ground to flour and mixed with a suitable portion (say its own weight) of the pitch, likewise ground, and the mixture then thoroughly mixed by stirring with the rest of the pitch in the fused state and the oil. Or the wood may be ground in the first place to a powder and added direct to the melted pitch and oil.

*Example 2.*

Pitch _____ 90 to 80 parts by weight
Ground wood or peat _____ 10 to 20 parts by weight Worked up as in Example 1.

*Example 3.*

A flexible pitch resulting from a distillation of gas tar stopped at a point at which a flexible pitch results is used, and finely divided wood, peat, or like organic material is added to the molten pitch in the proportion of about 10–20 per cent. by weight and thoroughly mixed therewith.

*Example 4.*

Pitch _____ 90 to 80 parts by weight
Oil cake from cotton seed, linseed, tung or soy beans_ 10 to 20 parts by weight
With or without linseed or other oil__ 7 parts by weight Worked up as in Example 1.

A suitable quantity of driers, for instance 0.3 parts by weight of lead oxid may be added if desired, and the mixture be oxidized in the molten state.

The treatment of pitch as explained so much reduces the viscosity at or toward the melting point, that the liquefying point of the composition is considerably higher than that of the pitch used. Also the strength of the material and of its compounds with mineral matter is largely increased. The effect of the added matter on hard pitch is greatly to reduce its brittleness.

When using mill dust as the organic material I may, for the reasons mentioned employ larger quantities than those above indicated. For example in Examples 1 to 3 I may employ up to about 30 per cent. by weight of mill dust instead of the wood or the like. By such incorporation I am enabled to obtain compositions of remarkable technical value, having a high melting point and possessing a low contraction when cold after incorporation with mineral matter to form a paving. Owing to the extreme fineness of the "mill dust", it can be incorporated in an absolutely intimate and uniform manner throughout the mass of pitch, and thus produce compositions of great technical value. With more than say 20 per cent. of wood flour for example, present, the contact between the wood particles becomes so increased that liquefaction by heating becomes incomplete. Mill dust, being such an impalpably fine substance, a larger proportion does not prevent liquefaction of the composition by heat, but the quantity of mill dust used must not approximate that of the pitch, and in general will not exceed more than about 30 per cent. as mentioned.

Compositions produced according to the invention may be incorporated with a large amount of mineral matter to form materials suitable for road making. For example a remarkably efficient road material can be obtained by incorporating about 12 parts by weight of coarsely crushed flint with one part by weight of a melted composition consisting of pitch and finely divided organic matter in the proportions above referred to. In this particular case it is desirable that the composition of pitch and organic matter shall be of such softness that it will take an impression of the thumb at about 65° F. Such softness can be obtained by the incorporation of a suitable oil (*e. g.* green oil) in quantity varying with the hardness of the original pitch. Compositions according to the invention can likewise be incorporated with a large amount of finely divided mineral matter, such for example as kieselguhr (for instance an equal weight) for road making purposes. For example, the composition of pitch, asphalt or bitumen and organic matter may be ground and added to the finely divided mineral matter to form a composition which may be applied as a powder for making or mending roads. Any of the compounds produced according to the invention may be employed for roads and it will be understood that the amount of added mineral matter may vary according to the particular nature of the material required. As another example, pitch, asphalt or bitumen may be ground to a fine state of division and mixed, without fusion, with finely divided organic matter in the proportion of about 5 to 20 per cent. or with mill dust in the proportion of say 5 to 30 per cent. relatively to the pitch, and the resulting mixture may then be mixed with a large proportion (say 12 parts by weight) of finely divided mineral matter. Such mixtures can be applied to roads in powdered state and consolidated by hot irons in a well known manner.

As one example of the technical advantages of the present invention it has been shown that a block 9x3x2 inches composed of 8.85 per cent. of a composition of pitch and finely divided organic matter, melted and incorporated with 91.15 per cent. of finely divided mineral matter only yielded 1/1000th of an inch under a loaf of 847 lbs. in 77 seconds when supported on two points 7 inches apart, while under a load of 1100 lbs. it yielded only 1/1000th of an inch in 16 seconds.

Another advantage secured by my invention is that cheap insulating or di-electric materials may be made by using carbon-free pitch. When it is desired to make this material, care must be taken that the melt is not heated to charring point.

The proportion of oil added in the present invention depends upon the hardness of the pitch.

Having now described my invention, what I claim as new and desire to secure by Letters Patent is:—

1. A composition of matter comprising distillation pitch and finely divided organic matter distributed throughout the mass of the pitch, said composition having a higher melting point than the original pitch but being fusible by heat.

2. A composition of matter comprising distillation pitch and finely divided organic matter distributed throughout the mass of the pitch, together with a small proportion of a softening oil, said composition having a higher melting point than the original pitch, with the same amount of oil, but being fusible by heat.

3. A composition of matter fusible by heat and comprising distillation pitch and about 5 to 30 per cent. of finely divided organic matter distributed throughout its mass.

4. A composition of matter fusible by heat and comprising distillation pitch and a small quantity of oil, with finely divided organic matter distributed throughout its mass in a proportion of about 5 to 30 per cent. of the pitch and organic matter together.

5. A composition of matter comprising distillation pitch with mill dust distributed throughout its mass in a proportion of about 5 to 30 per cent.

6. A composition of matter comprising distillation pitch with mill dust distributed throughout its mass, together with a small proportion of a softening oil, the mill dust being present in a proportion of about 5 to 30 per cent. of the pitch and mill dust taken together.

7. A composition of matter comprising distillation pitch, finely divided organic matter in a proportion of about 5 to 30 per cent. of the pitch and organic matter together, and a large quantity of mineral matter.

8. A composition of matter comprising distillation pitch, a small quantity of oil, finely divided organic matter in a proportion of about 5 to 30 per cent. of the pitch and organic matter, and a large quantity of mineral matter.

9. A composition of matter comprising distillation pitch together with about 5 to 30 per cent. of mill dust relatively to the pitch and mill dust taken together, and a large quantity of mineral matter.

10. A composition of matter comprising distillation pitch, a small quantity of oil, together with mill dust in a proportion of about 5 to 30 per cent. of the pitch and mill dust together, and a large quantity of mineral matter distributed throughout the mass.

11. A pulverulent composition applicable for road making and mending, comprising ground pitch, finely divided organic material in a proportion of about 5 to 30 per cent. relatively to the pitch and organic material together, and a large quantity of mineral matter.

In witness whereof, I have hereunto signed my name in the presence of two subscribing witnesses.

JOHN RADCLIFFE.

Witnesses:
  GEORGE C. BACON,
  THOMAS LAING WHITEHEAD.

---

Copies of this patent may be obtained for five cents each, by addressing the "Commissioner of Patents, Washington, D. C."